Feb. 15, 1949.  J. W. MONTGOMERY, SR  2,461,652
KNOCKDOWN CASTER
Filed July 29, 1946

INVENTOR.
James W. Montgomery, Sr.
BY Geo. Stevens
atty.

Patented Feb. 15, 1949

2,461,652

UNITED STATES PATENT OFFICE 2,461,652

KNOCKDOWN CASTER

James W. Montgomery, Sr., Duluth, Minn.

Application July 29, 1946, Serial No. 687,003

2 Claims. (Cl. 16—31)

This invention relates to casters, and has special reference to a knock-down caster, the principal object being to provide such a caster especially adapted for long wear and easy replacement of individual parts when any such become worn through long use.

Another object of the invention is to provide such a caster with an assortment of parts which may easily be assembled or taken apart for repair or replacement of individual parts in the average home.

Other objects and advantages will appear in the further description of the invention.

It is well known that strength and durability of a caster of such a character that is readily knock-down, is very essential; and to which end, the roller supporting bracket is of two separable like interlocking parts.

Figure 4:
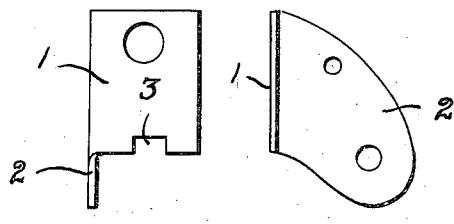
Fig. 4 is a top plan and side elevational view of the outermost half of the caster bracket.
Figure 5:
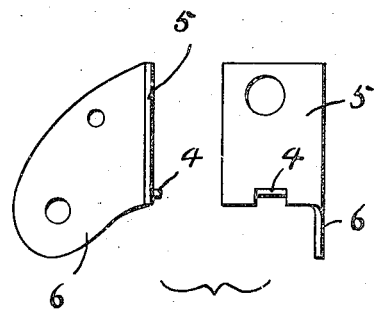
Fig. 5 is a top plan and side elevational view of of the innermost half of the bracket.
Figure 6:
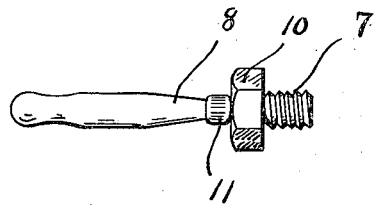
Fig. 6 is a side view of the nut-equipped caster pintle.
Figure 7:
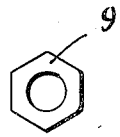
Fig. 7 is a plan view of the cooperative nut for the threaded end of the caster pintle.
Figure 8:
Fig. 8 is a side view of the single through safety bolt.
Figure 1:
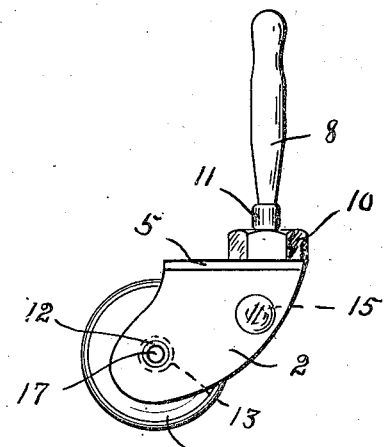
Fig. 1 is a side elevational view of one of the improved casters completely assembled.
Figure 2:
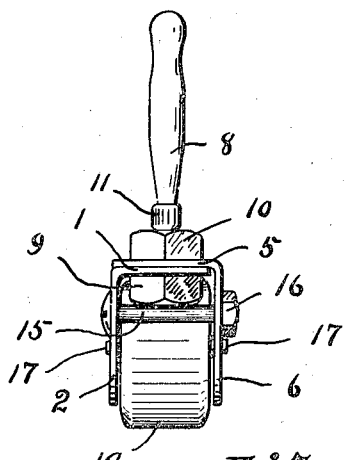
Fig. 2 is a front elevational view of Fig. 1.

The web 1 of the outermost half 2 of the bracket is provided with a notch 3 for the reception of the materially protruding key portion 4 of the web 5 of the innermost half 6 of the bracket. These two web portions are firmly united as by the threaded portion 7 of the caster pintle 8 when the nut 9 is firmly applied to said threaded portion as clearly shown in Figs. 1 and 2. It is apparent that the nut 9 for application to the threaded end of the pintle is provided with a companion lock-nut 10 which is at all times, except when slight vertical adjustment of the pintle 8 is required, screwed tightly against the enlargement or knob 11 of the pintle and forms a shoulder against which the web 5 is held as shown.

This caster when completely assembled is deemed novel in that it is provided with relatively short brass flanged bushings shown at 12. The flange being indicated at 13 occurs on the inner face of each side member 2 and 6 of the bracket prior to the assembling of the roller 14 between said side members.

Another prime feature of my knock-down caster is that it is provided with the safety bolt and nut 15 and 16 respectively, practically the entire length of said bolt being readily accessible as by pinchers for tightening or loosening said nut when desired and which bolt does not interfere with the adjustment of the pintle or the manipulation of the nuts 9 or 10. The bolt 15 also holds the bracket quite firmly together for adjustment or exchange of the pintle 8.

Figure 3:
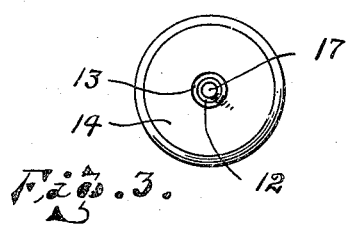
Fig. 3 is a side elevational view of the caster roller having the fixed axle therein carrying a flanged bushing.

In Fig. 3 the roller 14 is clearly illustrated having its fixed axle 17 carrying one of the flanged bushings 12.

What I claim is:

1. As a new article of manufacture, a knockdown caster comprising two like parts, each part comprising a single piece of sheet metal bent at right angles to form a pair of legs, each of said parts having a hole through each of the legs thereof; a pintle having a threaded end and a shoulder adjacent thereto; a nut; said parts being assembled with one leg of one of said parts overlapping the corresponding leg of the other of said parts and the other legs of said parts extending in spaced parallel relation to each other, said pintle extending through the holes in said overlapping legs with said shoulder engaging one of said legs, and said nut being installed on the threaded end of said pintle to hold said parts in assembled relation; a wheel; and an axle fixed within said wheel; said wheel being carried intermediate of said spaced parallel legs with said axle extending within opposed ones of the holes in said last mentioned legs whereby the last mentioned holes and axle form the rotatable connection for said wheel to said parts.

2. The structure as set forth in claim 1 and a safety bolt through said spaced parallel legs parallel to said axle to hold said parts in assembled relation in conjunction with said pintle and nut.

JAMES W. MONTGOMERY, Sr.

REFERENCES CITED

The following references are of record in the file of this patent:

UNITED STATES PATENTS

| Number | Name | Date |
|---|---|---|
| 346,161 | Huster | July 27, 1886 |
| 1,899,394 | Noelting et al. | Feb. 28, 1933 |
| 1,922,099 | Kilian | Aug. 15, 1933 |
| 1,987,404 | Korte | Jan. 8, 1935 |

FOREIGN PATENTS

| Number | Country | Date |
|---|---|---|
| 1,202 | Great Britain | Jan. 17, 1903 |